United States Patent
Van Damme et al.

(10) Patent No.: US 6,883,843 B2
(45) Date of Patent: Apr. 26, 2005

(54) REINFORCED IMPACT BEAM

(75) Inventors: Peter A.M. Van Damme, AA Bergen op Zoom (NL); Paul Corscadden, Winsford (GB); Willem Dekeyser, Assebroek (BE)

(73) Assignees: N.V. Bekaert S.A., Zwevegem (BE); Polynorm N.V., Bunschoten (NL)

( * ) Notice: Subject to any disclaimer, the term of this patent is extended or adjusted under 35 U.S.C. 154(b) by 0 days.

(21) Appl. No.: 10/383,259

(22) Filed: Mar. 7, 2003

(65) Prior Publication Data
US 2003/0184099 A1 Oct. 2, 2003

(30) Foreign Application Priority Data
Mar. 8, 2002 (EP) .............................................. 02100236

(51) Int. Cl.[7] .............................................. B60R 19/03
(52) U.S. Cl. ..................... 293/120; 293/121; 293/122; 293/102; 296/146.6
(58) Field of Search .................................. 293/120, 121, 293/122, 102; 156/142, 307.7, 140; 152/540, 527, 555, 451; 57/258, 311, 237; 474/265, 260, 263; 428/591, 375, 107, 294.1, 515, 297.4, 300.7, 98, 64.1, 35.7; 427/240; 52/786.11; 198/847; 51/295; 442/8, 316

(56) References Cited

U.S. PATENT DOCUMENTS

| | | | | |
|---|---|---|---|---|
| 3,607,502 A | * | 9/1971 | Marzocchi et al. | 156/142 |
| 3,612,139 A | * | 10/1971 | Marzocchi et al. | 152/540 |
| 3,660,974 A | * | 5/1972 | Marzocchi et al. | 57/258 |
| 4,031,768 A | * | 6/1977 | Henderson et al. | 474/265 |
| 4,098,316 A | * | 7/1978 | Carvalho et al. | 152/540 |
| 4,265,981 A | * | 5/1981 | Campbell | 428/591 |
| 4,292,111 A | * | 9/1981 | Bezwada | 156/307.7 |
| 4,408,444 A | | 10/1983 | Baillievier | |
| 4,530,684 A | * | 7/1985 | Miranti, Jr. | 474/265 |
| 4,935,301 A | * | 6/1990 | Rerup et al. | 428/375 |
| 5,024,261 A | * | 6/1991 | Igarashi et al. | 152/527 |
| 5,290,079 A | * | 3/1994 | Syamal | 293/120 |
| 5,529,826 A | | 6/1996 | Tailor et al. | |
| 5,609,706 A | * | 3/1997 | Benedict et al. | 156/140 |
| 5,637,164 A | * | 6/1997 | Dwenger et al. | 152/555 |
| 5,681,612 A | * | 10/1997 | Benedict et al. | 427/240 |
| 5,722,226 A | * | 3/1998 | Matsumaru | 57/311 |
| 5,794,403 A | * | 8/1998 | Oberlander et al. | 52/786.11 |
| 5,830,248 A | * | 11/1998 | Christianson et al. | 51/295 |
| 5,839,264 A | * | 11/1998 | Uchio | 57/237 |
| 5,906,269 A | * | 5/1999 | Zabron et al. | 198/847 |
| 6,004,650 A | * | 12/1999 | Schweizer et al. | 428/107 |
| 6,117,534 A | * | 9/2000 | Yamamura et al. | 428/294.1 |

(Continued)

FOREIGN PATENT DOCUMENTS

| | | |
|---|---|---|
| DE | 42 18 434 A1 | 12/1993 |
| EP | 0 547 625 A1 | 6/1993 |
| EP | 0 552 370 A1 | 7/1993 |
| EP | 0 595 607 A1 | 5/1994 |
| EP | 0 790 349 B1 | 6/2000 |
| GB | 2 141 722 A | 1/1985 |
| JP | 5-204451 A | 8/1993 |
| WO | WO 99/20682 A1 | 4/1999 |
| WO | WO 99/28547 A1 | 6/1999 |

*Primary Examiner*—Kiran B. Patel
(74) *Attorney, Agent, or Firm*—Foley & Lardner LLP

(57) ABSTRACT

An impact beam having a polymer matrix and a metal reinforcing structure, the metal reinforcing structure including metal cords that can be made from metal elements having a diameter of 100 μm or more. The polymer matrix can include a thermoplastic material and/or a fiber material, and the metal can be steel, and the metal cords can be parallel to each other. The polymer matrix can include two or more layers that can be made from the same or different material, one of which can be positioned around the surface of the metal cords and can have a mechanical bond with the cord. The invention also includes a method of making the impact beam.

18 Claims, 6 Drawing Sheets

U.S. PATENT DOCUMENTS

| | | | |
|---|---|---|---|
| 6,177,202 B1 * | 1/2001 | Takehara et al. | 428/515 |
| 6,453,960 B1 * | 9/2002 | Kondo et al. | 152/451 |
| 6,465,377 B2 * | 10/2002 | Andriaensen et al. | 442/6 |
| 6,491,598 B1 * | 12/2002 | Rosenboom | 474/260 |
| 6,576,331 B1 * | 6/2003 | Ryan | 428/297.4 |
| 2002/0128105 A1 * | 9/2002 | Hedberg et al. | 474/265 |
| 2002/0182961 A1 * | 12/2002 | Clercq et al. | 442/316 |
| 2003/0008126 A1 * | 1/2003 | Boesman et al. | 428/300.7 |
| 2003/0050143 A1 * | 3/2003 | Gregg et al. | 474/263 |
| 2003/0050144 A1 * | 3/2003 | Moncrief et al. | 474/263 |
| 2003/0082336 A1 * | 5/2003 | Braekevelt | 428/98 |
| 2003/0129336 A1 * | 7/2003 | Bourgois et al. | 428/35.7 |
| 2003/0129350 A1 * | 7/2003 | Foster | 428/64.1 |

* cited by examiner

REINFORCED IMPACT BEAM

FIELD OF THE INVENTION

The present invention relates to impact beams and reinforcements, and a method to provide such impact beam. The invention further relates to the use of an impact beam for support of bumpers of vehicles or for impact reinforcing of parts of vehicles.

BACKGROUND OF THE INVENTION

Presently known composite impact beams comprise a polymer matrix, reinforced with glass fibers or other polymer fibers. An impact beam may also comprise metal parts, usually on the places where the impact beam receives compression load during impact. U.S. Pat. No. 5,290,079 gives an example of such impact beam. In U.S. Pat. No. 5,290,079 the impact beam also comprises a woven wire mesh, which is to improve the ductility and flexibility of the impact beam.

Presently known composite impact beams in general have the disadvantage that they tend to break or in two parts at the location of impact, or into several small particles which are projected towards objects which are in the periphery of the impact beam. This may cause further damage to these objects.

SUMMARY OF THE INVENTION

It is an object of the present invention to provide an improved impact beam having increased resistance to impact it is also an object of the invention to provide an impact beam having a high-energy absorption. It is an other object of the invention to provide an impact beam having an improved integrity during and after impact.

An impact beam as subject of the invention comprises a polymer matrix and a metal reinforcing structure. According to the present invention, the metal reinforcing structure comprises one or more metal cords.

Preferably, the metal reinforcing structure comprises two or more metal cords, the metal cord being preferably essentially parallel to each other.

The wording "essentially parallel" is to be understood in a sense that for each pair of metal cords, said cords being present one next to the other, for each point of an axis of a first of these metal cords, a related point of the axis of the second metal cord can be defined, which point is the crossing point of the axis of the second metal cord, with the plane through the point of the axis of the first metal cord and being perpendicular to the direction of the axis of the first metal cord at this point. The difference in direction of the axis's of the metal cords, in each pair of points is less than 25°, e.g. less than 15° or even less than 10°, such as less than 5°.

An impact beam is characterized by a direction in which impact forces are expected to work on the impact beam. This direction is hereafter referred to as 'impact direction'. Impact beams are characterized by an impact plane, being the plane perpendicular to the direction of impact. One dimension of this plane is usually relatively large and is hereafter referred to as length of the impact beam. The second dimension of the impact beam in this impact plane, is usually much smaller than the length. This direction is hereafter referred to as height of the impact beam. The dimension of the impact beam, perpendicular to impact plane is referred to as thickness of the impact beam.

The metal cord of an impact beam as subject of the invention may be provided in a direction essentially parallel to the length of the impact beam.

Most preferably however, the metal cords are provided with a curved shape during molding of the impact beam as subject of the invention. The curves have a bending radius in the plane perpendicular to the plane defined by the length and height, and parallel to the length of the impact beam. The curvature preferably extends to the side of the impact beam on which the impact force is to be expected to work.

The metal cord preferably used for an impact beam as subject of the invention, are of a type which can absorb relatively high amounts of impact energy but also other metal cords may be used.

Examples here are:

multi-strand metal cords e.g. of the m×n type, i.e. metal cords, comprising m strands with each n wires, such as 4×7×0.10 or 3×3×0.18; the last number is the diameter of each wire, expressed in mm.

compact cords, e.g. of the 1×n type, i.e. metal cords comprising n metal wires, n being greater than 8, twisted in only one direction with one single step to a compact cross-section, such as 1×9×0.18 or 1×12× 0.18; the last number is the diameter of each wire, expressed in mm.

layered metal cords e.g. of the l+m(+n) type, i.e. metal cords with a core of l wires, surrounded by a layer of m wires, and possibly also surrounded by another layer of n wires, such as 2+4×0.18; the last number is the diameter of each wire, expressed in mm.

single strand metal cords e.g. of the 1×m type, i.e. metal cords comprising m metal wires, m ranging from two to six, twisted in one single step, such as 1×4×0.25; the last number is the diameter of each wire, expressed in mm.

Open metal cords e.g. of the m+n type, i.e. metal cords with m parallel metal wires surrounded by n metal wires, such as disclosed in U.S. Pat. No. 4,408,444, e.g. a metal cord 2+2×0.25; the last number is the diameter of each wire, expressed in mm.

All cords as described above can be equipped with one or more spiral wrapped wires to increase the mechanical bond of the cords in the polymer matrix, and/or to bundle the n single parallel crimped or non-crimped but plastically deformed wires if the cord is provided using such parallel wires.

Preferably however, the metal cord used in the context of the present invention may be a metal cord with a high elongation at fracture, i.e. an elongation exceeding 4%, e.g. an elongation between 5% and 10%. High elongation metal cord has more capacity to absorb energy. Such a metal cord is:

either a high-elongation or elongation metal cord (HE-cords), i.e. a multi-strand or single strand metal cord with a high degree of twisting (in case of multi-strand metal cords: the direction of twisting in the strand is equal to the direction of twisting of the strands in the cord: SS or ZZ, this is the so-called Lang's Lay) in order to obtain an elastic cord with the required degree of springy potential; an example is a 3×7×0.22 High Elongation metal cord with lay lengths 4.5 mm and 8 mm in SS direction;

or a metal cord which has been subjected to a stress-relieving treatment such as disclosed in EP-A1-0 790 349; an example is a 2×0.33+6×0.33 SS cord.

as an alternative or in addition to a high elongation metal cord, the metal cord may be composed of one or more wires which have been plastically deformed so that they are wavy. This wavy nature additionally increases the elongation. An example of a wavy pattern is a helix or a spatial crimp such as disclosed in WO-A1-99/28547.

According to the required properties of the impact beam as subject of the invention, all metal cords may be identical, or alternatively, different metal cords may be used to provide the impact beam.

The metal elements used to provide these metal cords may have a diameter, being a diameter of a radial cross section of the metal elements, which is equal or larger than 100 $\mu$m, more preferred larger than 125 $\mu$m e.g. more than 150 $\mu$m or even more than 175 $\mu$m. All metal elements of a metal cord may have the same diameter, or the diameters of the metal elements may differ from each other.

Preferably, the optical diameter of the metal cord is larger than 200 $\mu$m, or even larger than 250 $\mu$m, such as larger than 300 $\mu$m or more. The optical diameter of the metal cord is to be understood as the diameter of the smallest imaginary circle, encompassing the radial cross section of the metal cord.

Most preferably steel cords are used to provide the impact beam as subject of the invention. Presently known steel alloys may be used to provide the steel cords. Preferably, the steel cords are subjected to a stress relieving thermal treatment, e.g. by passing the steel cord through a high-frequency or mid-frequency induction coil of a length that is adapted to the speed of the steel cord during production. It was observed that, increasing the temperature to more than 400° C. for a certain period of time, a decrease in tensile strength of the steel cord (a reduction of approximately 10%), but at the same time, an increase of the plastic elongation of the cord before rupture of more than 6% may be obtained. Such steel cords are hereafter referred to as stress relieved steel cords.

An impact beam as subject of the invention comprises an elastomeric, thermoset or thermoplastic polymer matrix.

The polymer matrix may comprise polymer material, being a thermoplastic or thermoplastic elastomer polymer material. More preferred, the polymer material is selected from the group consisting of polypropylene, polyethylene, polyamide, polyethylene terephtalate, polybutylene terephtalate, polycarbonate, polyphenylene oxide as well as blends of these materials, or thermoplastic elastomers, e.g. polyamide- or polyolefin-based thermoplastic elastomers such as polyesteramides, polyetheresteramides, polycarbonate-esteramides or polyether-block-amides.

Alternatively, the polymer material may be a thermoset polymer material, preferably selected from the group consisting of unsaturated polyesters, epoxies, vinyl-esters and phenolic resins.

The polymer matrix may further comprise glass- or C-fibers, polymeric fibers and/or mineral fillers to reinforce the polymer matrix. Fibers can either be random, unidirectional, woven; stitched, chopped, or a combination of those.

The polymer matrix may have two layers.

The first layer, hereafter referred to as 'embedding layer' makes contact to the metal cord surfaces. Such embedding layer may be extruded around the metal cord, or several metal cords may be bundles and provided with an embedding layer coating. Alternatively, several metal cords are laminated in one plane between two foils of polymer material, providing a tape-like structure, hereafter generally referred to as 'metal cord tape', or steel cord tapes in case the metal cord tape is provided using steel cords.

Around this metal cord with embedding layer, a second layer, hereafter referred to as volume layer, may be provided, e.g. by extrusion or in a molding process.

Preferably the polymer material of the embedding layer is an thermoplastic elastomeric or thermoplastic material, preferably a thermoplastic polymer material, more preferred being selected from the group consisting of polypropylene, polyethylene, polyamide, polyethylene terephtalate, polybutylene terephtalate, polycarbonate, polyphenylene oxide as well as blends of these materials, or thermoplastic elastomers, e.g. polyamide- or polyolefin-based thermoplastic elastomers such as polyesteramides, polyetheresteramides, polycarbonate-esteramides or polyether-block-amides. Alternatively, the polymer material may be a thermoset polymer material, preferably selected from the group consisting of unsaturated polyesters, epoxies, vinyl-esters and phenolic resins.

The polymer material of the volume layer is a thermoplastic elastomeric, thermoset or thermoplastic material, preferably a thermoplastic polymer material, more preferred being selected from the group consisting of polypropylene, polyethylene, polyamide, polyethylene terephtalate, polybutylene terephtalate, polycarbonate, polyphenylene oxide as well as blends of these materials, or thermoplastic elastomers, e.g. polyamide- or polyolefin-based thermoplastic elastomers such as polyesteramides, polyetheresteramides, polycarbonate-esteramides or polyether-block-amides. Alternatively, the polymer material may be a thermoset polymer material, preferably selected from the group consisting of unsaturated polyesters, epoxies, vinyl-esters and phenolic resins.

This volume layer may further comprise glass- or C-fibers, polymeric fibers and/or mineral fillers to reinforce the volume layer. Fibers can either be random, unidirectional, woven, stitched, chopped, or a combination of those.

In order to assure a good adhesion between the metal cords and the polymer material, an adhesion promoter can be applied on the metal cords.

Possible adhesion promoters are bifunctional coupling agents such as silane compounds. One functional group of these coupling agents is responsible for the binding with the metal or metal oxides; the other functional group reacts with the polymer.

More details about these coupling agents can be found in the PCT application WO-A-99/20682.

In order to improve the impact resistance to the required level, the amount of metal cord per section of the impact beam as subject of the invention in a direction defined by the height and thickness of the impact beam, may be chosen.

Best results are obtained when the metal cords are arranged in one or more planes, parallel to each other and to the impact plane of the impact beam, or one or more planes parallel to each other and being provided with a curved shape during molding of the impact beam. The curvature preferably extends to the side of the impact beam on which the impact force is to be expected to work.

Each plane may be provided by means of a metal cord tape or steel cord tape, having embedding layers which may be equal or different from each other. Each plane may comprise metal or steel cords, being equal or different from each other.

An impact beam as subject of the invention may be manufactured using different production techniques.

A method for providing an impact beam, comprises the steps of providing a polymer matrix sheet;

providing metal cords and/or metal cord tapes;

heating the polymer matrix sheet;

bringing the metal cords and/or metal cord tapes and polymer matrix sheet together and providing the metal cords and polymer matrix sheet to a mold;

molding the metal cords and/or metal cord tapes and polymer matrix sheet, providing an impact beam;

cooling the impact beam.

Alternatively, a method for providing an impact beam, comprises the steps of providing metal cords and/or metal cord tapes;

extruding polymer material and providing extruded polymer material to the metal cords and/or metal cord tapes;

molding the metal cords and/or metal cord tapes and polymer matrix sheet, providing an impact beam;

cooling the impact beam.

As another alternative, a method for providing an impact beam, comprises the steps of providing fiber strands and/or reinforcing fabrics;

providing metal cords and/or metal cord tapes, providing uncured or not fully cured polymer material to said fiber strands and/or reinforcing fabrics and metal cords and/or metal cord tapes by drawing the fiber strands and/or the reinforcing fabrics and the metal cords and/or metal cord tapes, through a bath of uncured or not fully cured polymer material;

curing the fiber strands and/or the reinforcing fabrics and the metal cords and/or metal cord tapes and the uncured or not fully cured polymer material by drawing the fiber strands and/or the reinforcing fabrics and the metal cords and/or metal cord tapes and the uncured or not fully cured material through a heated pultrusion die, so providing a pultruded article;

cutting pultruded article to lengths, so providing an impact beam.

As even an other alternative, a method for providing an impact beam, comprises the steps of providing metal cords and/or metal cord tapes;

bringing the metal cords and/or metal cord tapes in an extrusion mold and position the metal cords and/or metal cord tapes in the mold;

providing polymer material in the extrusion mold to provide an impact beam;

cooling the impact beam.

Preferably, a polymer matrix sheet, most preferably a Glass Mat Reinforced Thermoplastic Prepreg is used. The prepreg can either contain random, unidirectional, woven, stitched or chopped fibers from glass or other materials or combinations of these. Similarly, long fiber thermoplastic compounds can be used comprising chopped strand glass fibers or fibers from other materials This thermoplastic prepreg is heated during a prepreg-heating step, using any kind of oven system until the thermoplastic resin melts. In case of long fiber thermoplastic compound, an extruder is used to melt the long fiber thermoplastic compound.

After the polymer heating step and possibly a metal cord and/or metal cord tape heating step, the metal cords or metal cord tape and the polymer material are brought together, usually by providing the polymer material e.g. glass mat reinforced thermoplastic prepreg around the metal cord or metal cord tape, and provided to a compression molding tool. The metal cord or metal cord tape and polymer material together are subjected to a molding step. The metal cord or metal cord tape is positioned in the location of the section of the profile where it is intended to be located to obtain the maximum performance. During the closing of the mold, the polymer material flows and encapsulates the metal cord or metal cord tape. Possibly, the metal cords or the metal cord tape is provided with a curved shape.

After the mold is closed, the mold and molded material is cooled during a cooling step. The mold is re-opened. An impact beam as subject of the invention is so provided.

The same molding process can be used, but the oven is replaced by an extruder which produces blobs of polymer material, e.g. hot lofted glass-filled thermoplastics or long fiber thermoplastic compound that are then manipulated into the tool or mold, together with the metal cord or metal cord tape. After molding, the molded material is cooled.

Alternatively, glass and/or other fiber strands and metal cords or metal cord tape may be subjected to a pultrusion process in order to provide an impact beam as subject of the invention. First fiber strands and/or reinforcing fabrics and metal cords or metal cord tape are provided. Uncured or not fully cured polymer material is provided to these fiber strands and/or reinforcing fabrics and metal cords or metal cord tape by drawing them through a bath of uncured or not fully cured material. Then the fiber strands and/or reinforcing fabrics and cords and the polymeric polymer material are drawn through a heated pultrusion die in case of a thermoset material or through a cooling die in case of thermoplastic material. A pultruded article is so provided. The pultruded article is cut into lengths. Each cut length is than an impact beam as subject of the invention. In a second step the impact may be bend or shaped to the desired end shape.

Alternatively, glass and/or other fiber strands and metal cords or metal cord tape may be subjected to an over-extrusion process in order to provide an impact beam as subject of the invention. Metal cords or metal cord tapes are provided and brought in an extrusion mold and position in the mold. Polymer material, e.g. thermoplastic material is provided in the extrusion mold, e.g. by extrusion. After cooling, the mold comprises now an impact beam. Possibly, the polymer material comprises glass fibers, next to the polymer material, which is or fully, or partially or not cured.

The impact beam as subject of the invention may further comprise openings for fixings or mounting other objects. These openings can be brought into the impact beam by punching, drilling, CNC, laser cutting or similar techniques, but also by means of inmold punching.

Preferably, although not always necessarily, the metal cords or metal cord tapes may also be heated during a metal cord heating step, using any kind of oven or by induction heating.

Best impact resistance is obtained when the metal cords are embedded in the polymer matrix, having either one or more layers, in such a way that they have a limited freedom to elongate and/or untwist during impact.

Depending on the type of the metal cord construction, a relatively large amount of impact energy may be absorbed depending on the impact absorption mechanism, which is typical for that metal cord construction.

High elongation (HE-) cords can absorb impact energy by the structural deformation of the cords due to movements of strands one to another in the cord. When structurally deformed filaments are used to provide the metal cords, also the removing of the structural deformation out of the filaments during elongation of the metal cord will cause an absorption of the impact energy. In case the metal cord is a stress relieved steel cord, also the plastic deformation of the filaments will provide an absorption of impact energy.

The polymer matrix is preferably bound to the metal cord by means of a mechanical bond. The polymer matrix may or may not be bound to the metal cords by means of a chemical bond. During a local impact, the polymer matrix, eventually by means of an embedding layer and a volume layer, distribute the local force over the full cord length. This results in a full use of the cord's energy absorption abilities hence the energy to be absorbed by other parts outside the beam is reduced and local breakage of the polymer matrix is postponed. The energy absorption of the cord is either through plastic stretching of the cord itself, through torsional deformation of the cord such as untwisting, or energy dissipation in the interface between cord and polymer layer due to friction when a relative movement of cord versus matrix is taking place.

If the impact force is such that the local stresses in the polymer matrix exceed its breaking strength the polymer matrix will fall apart into pieces which still adhere to the metal cords. This falling apart will absorb a limited amount of impact energy, but after this falling apart, the metal cords may elongate to a larger extent and will be able to absorb to a large extent all impact energy possible until they break.

Alternatively, when a polymer matrix comprising an embedding layer and a volume layer, this volume layer preferably will fall apart first by impact. The pieces adhere to the embedding layer and allow the embedding layer and the metal cords to extend to some extent. Then possibly the embedding layer, will fall apart but will adhere to the metal cords. These metal cords can then elongate and absorb the impact energy, which is still left.

When in an impact beam several metal cord tapes are used, all parallel to each other, the bond between two metal cord tapes may be broken. Impact energy may then be absorbed due to the friction caused by the relative movement of both metal cord tapes relatively to each other.

An impact beam as subject of the invention may be used to support soft bumpers of vehicles such as cars, busses or trucks. It may also be used to improve the impact resistance other elements of the vehicle's coachwork to impact forces. Impact beam as subject of the invention may be used to make e.g. doors, frame, bonnet or hood and or cross beams more impact resistant. A person skilled in the art understands that the shape of cross sections of an impact beam as subject of the invention, as well as the outer shape of the impact beam, may be adjusted to the use of the impact beam.

The impact beam as subject of the invention absorbs the impact energy and protects the other elements of the vehicle for damaging. The impact beam as subject of the invention also prevents the particles of the polymer matrix to damage peripheral elements of the vehicle, since the integrity of the impact beam after impact can be secured.

BRIEF DESCRIPTION OF THE DRAWINGS

The invention will now be described into more detail with reference to the accompanying drawings wherein (See drawings below)

DESCRIPTION OF THE PREFERRED EMBODIMENTS OF THE INVENTION

Figure 1A:
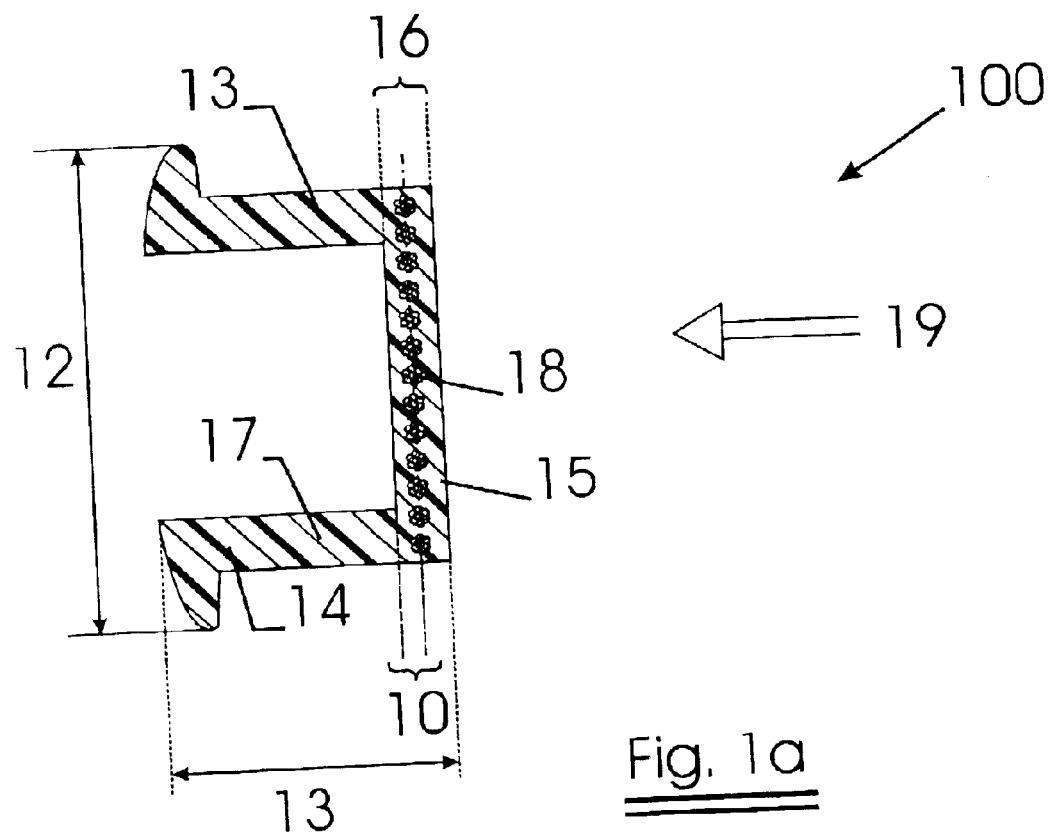
FIG. 1a being schematically a view-of a cross section of an impact beam as subject of the invention FIG. 1b being schematically a front view of an impact beam as subject of the invention.
Figure 1B:
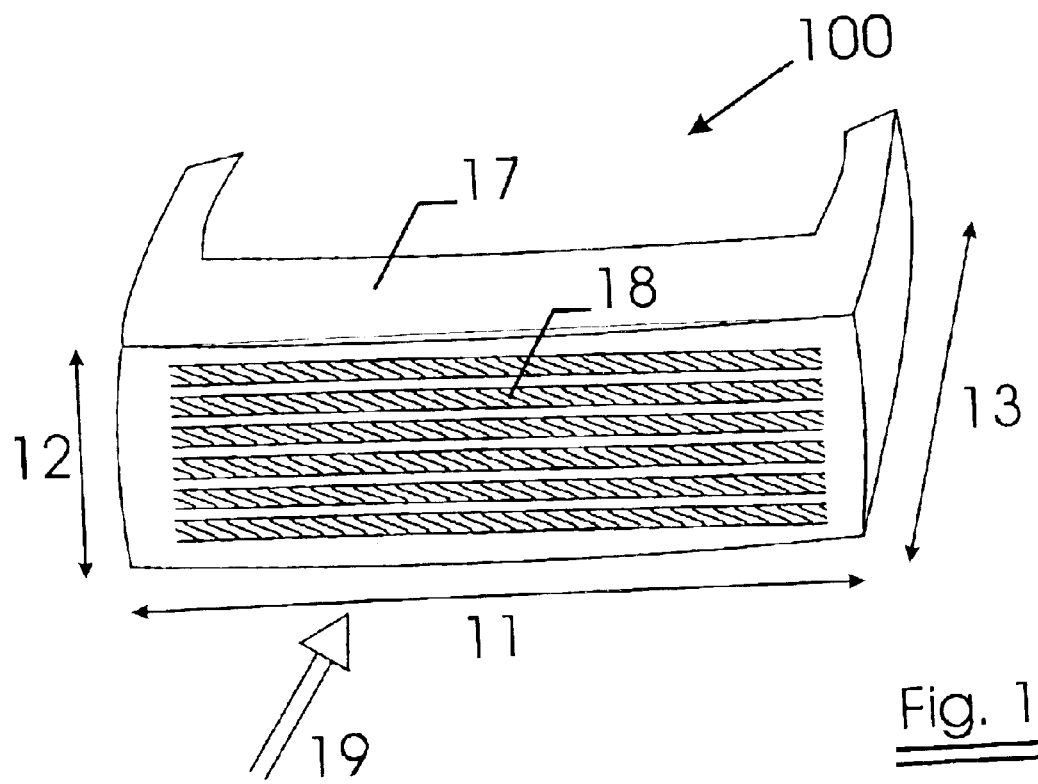

An impact beam as subject of the invention is schematically shown in FIG. 1a and FIG. 1b.

An impact beam 100 has a length 11, which is substantially larger than the height 12 and the thickness 13 of the impact beam 100. The embodiment as shown in FIG. 1 has a thickness that is provided by a pair of legs 14 and a main volume 15. The legs 14 may be used to fix the impact beam to other parts of the object to which it is to be mounted, whereas the main volume 15 (with its thickness 16) will absorb most of the impact energy provided by an impact in direction as indicated with arrow 19.

The main volume 15 and the legs 14 comprise a polymer matrix. In the main volume 15, metal cords 18 are present in a direction essentially parallel to the length 11 of the impact beam 100. Preferably all metal cord are present in one or more planes 10. The metal cords 18 used to provide the metal cord tape were 7×7 cords, being a core strand of a filament of 0.21 mm, round which 6 filaments of 0.19 mm are twisted. Around this core strand, 6 strands are twisted, each strand comprising a core filament of 0.19 mm around which 6 filaments of 0.175 mm are twisted.

The matrix is a glass fiber filled polypropylene.

Figure 2:
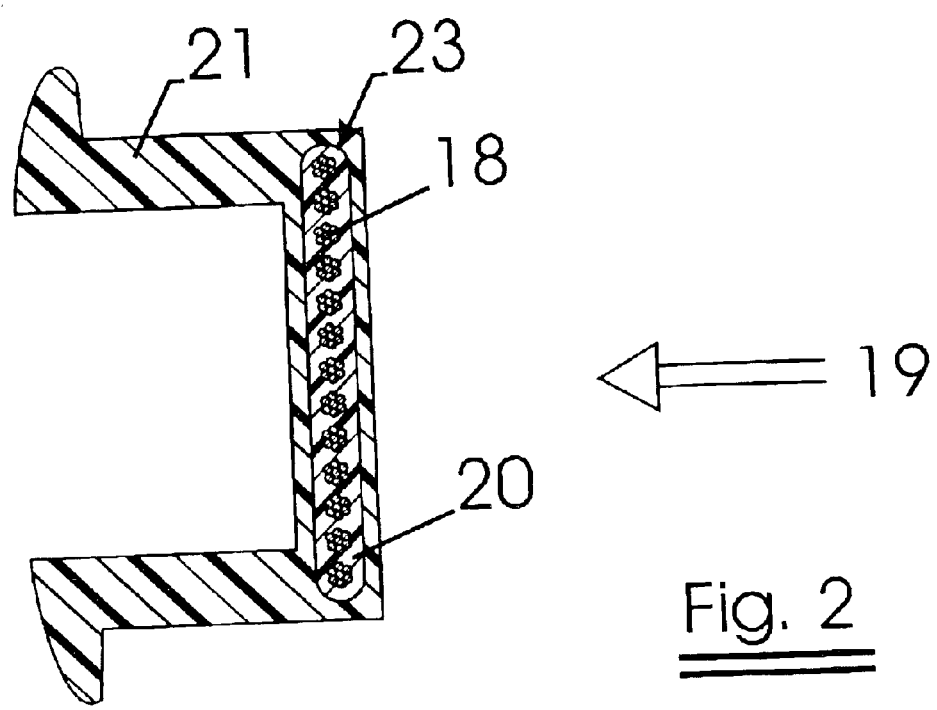
FIG. 2, FIG. 3, FIG. 4a and FIG. 4b being schematically a view of a cross section of an alternative impact beam as subject of the invention.
Figure 3:
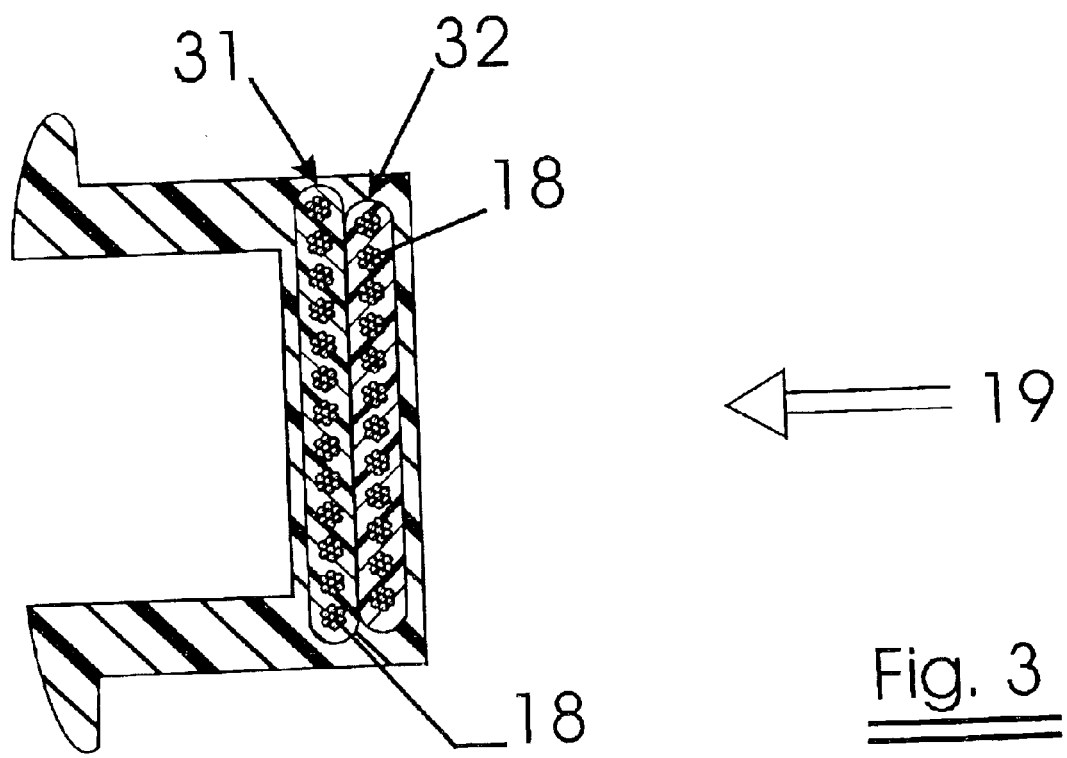

Alternative embodiments are shown in FIG. 2, FIG. 3 and FIG. 4.

FIG. 2 shows an impact beam as subject of the invention which comprises around metal cord 18 an embedding layer 20 of polymer matrix and a second so-called volume layer 21 of polymer material.

The metal cord are provided by means of a metal cord tape 23 which is provided in a plane essentially perpendicular to the impact direction 19. The metal cords used to provide the metal cord tape were 7×7 cords, being a core strand of a filament of 0.21 mm, round which 6 filaments of 0.19 mm are twisted. Around this core strand, 6 strands are twisted, each strand comprising a core filament of 0.19 mm around which 6 filaments of 0.175 mm are twisted.

Type polymer material of the embedding layer 20 was a polyolefin based thermoplastic elastomer.

Type polymer material of volume layer 21 is a glass fiber filled polypropylene.

FIG. 3 shows another alternative embodiment of an impact beam as subject of the invention. The metal cords 18 are provided by means of two metal cord tapes 31 and 32, which are provided parallel to each other and essentially parallel to the impact direction 19.

Figure 4A:
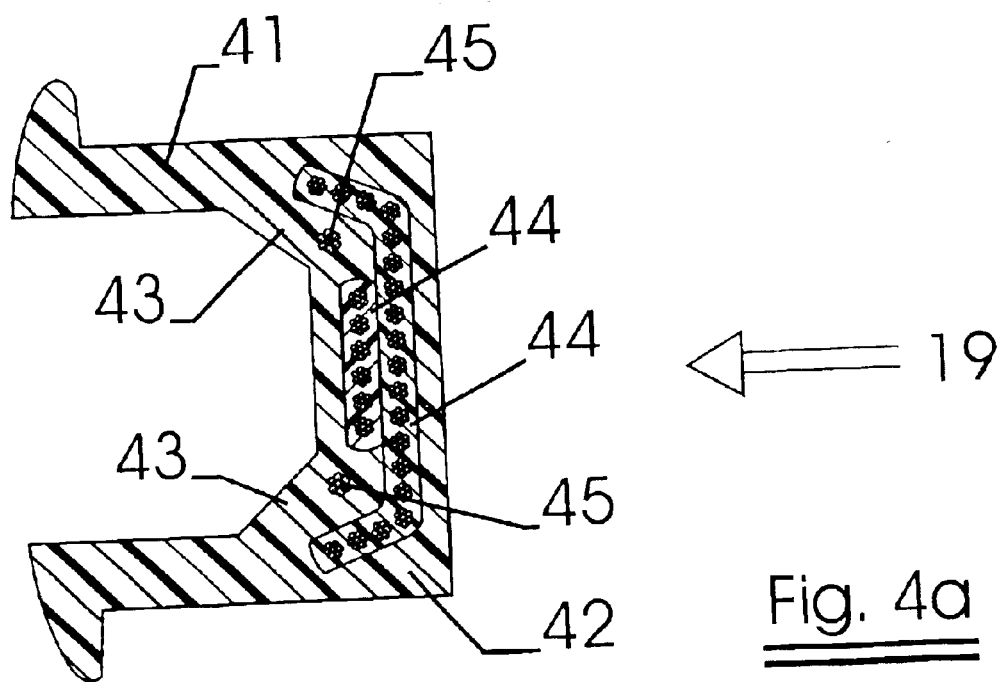

FIG. 4a shows an improved impact beam as subject of the invention where the legs 41 and main volume 42 are connected to each other by means of a transition zone 43. Several metal cord tapes 44 and possible individual metal cords 45 may be used to provide impact resistance in both the main volume 42 or the transition zone 43.

Figure 4B:
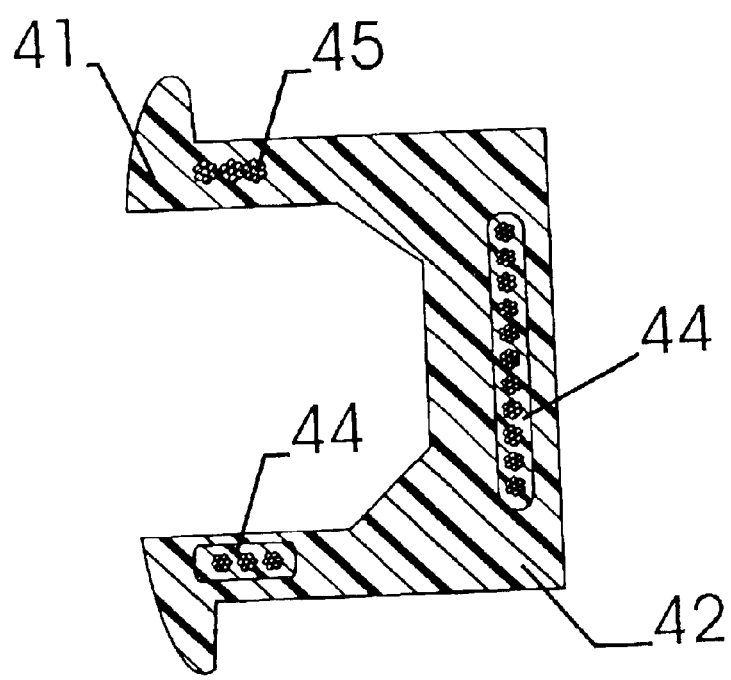
Figure 5A:
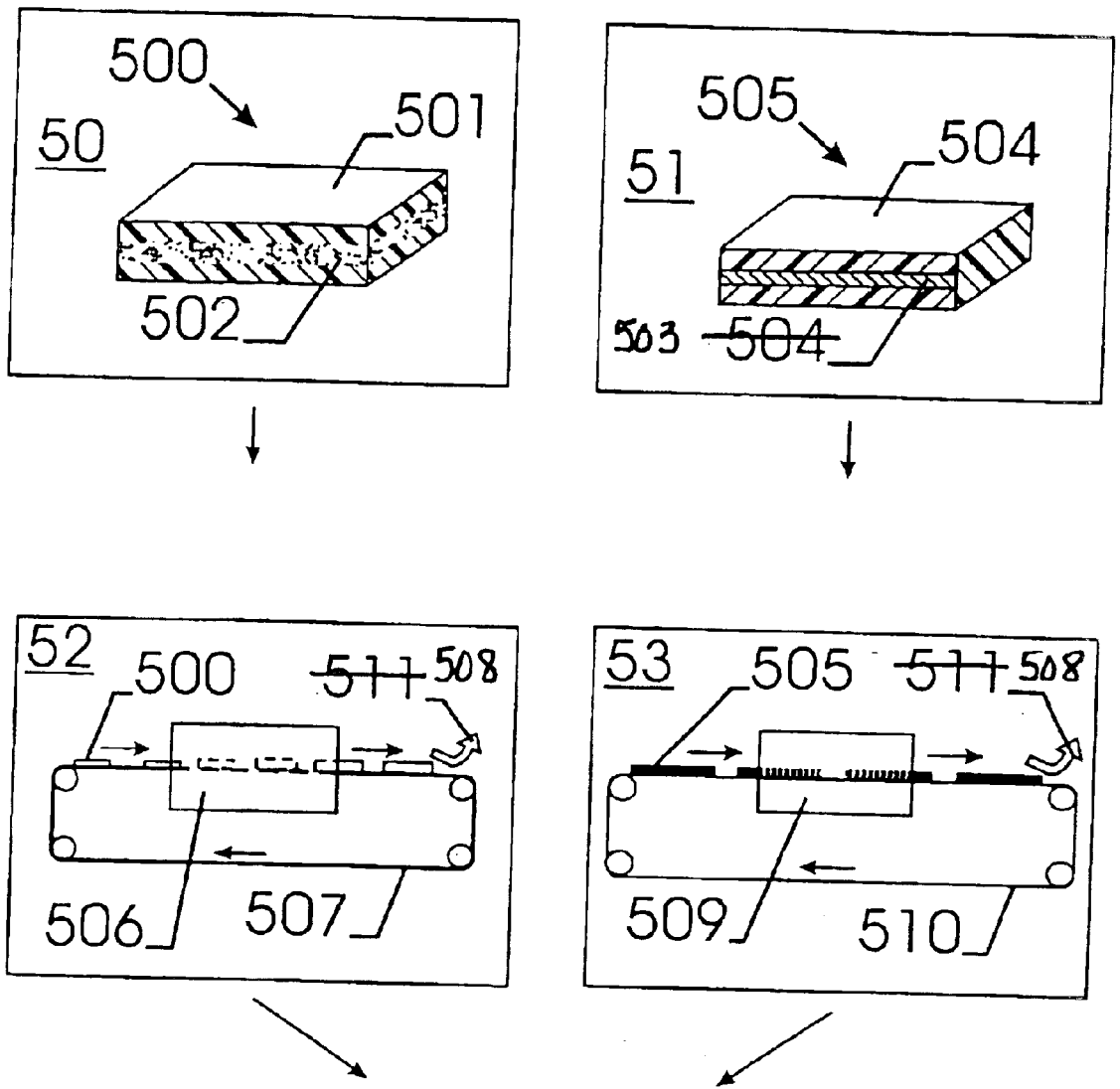
FIGS. 5a to 5c being a scheme of a method to provide an impact beam as subject of the invention.
Figure 5B:
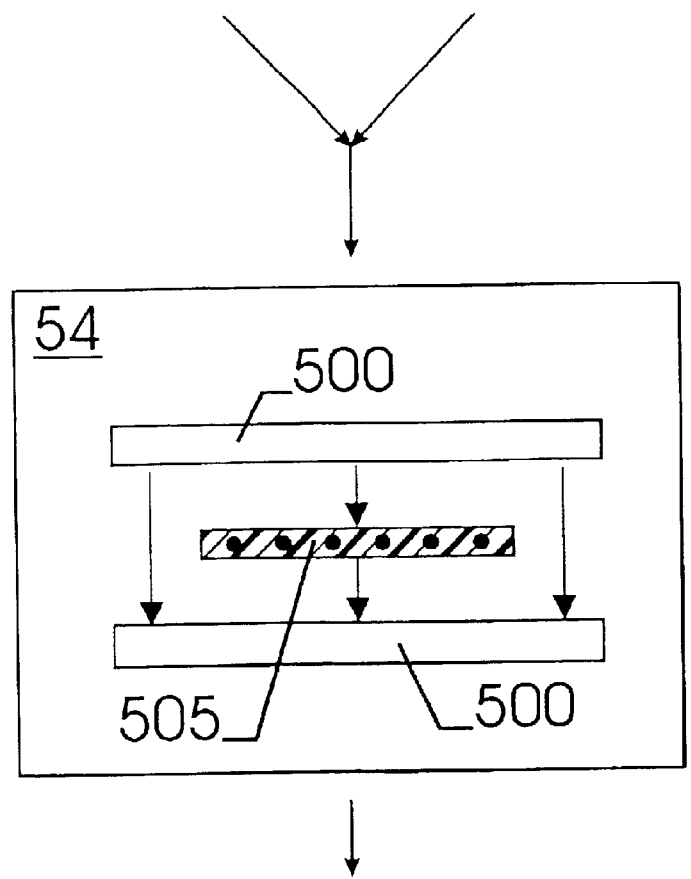
Figure 5B:
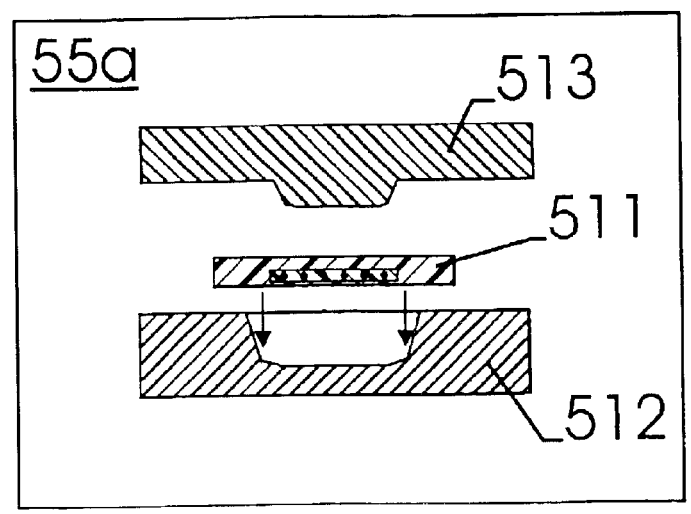
Figure 5C:
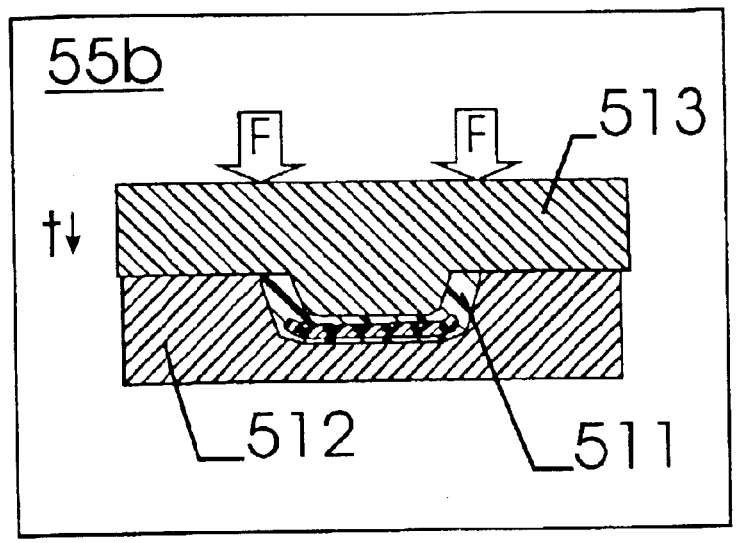

FIG. 4b shows an other alternative impact beam as subject of the invention. Several metal cord tapes 44 and possible individual metal cords 45 may be used to provide impact resistance in both the main volume 42 or the legs 41.

Turning now to a method to provide an impact beam as subject of the invention, such method is schematically shown in FIG. 5.

First a glass mat reinforced thermoplastic prepreg 500 is provided comprising polymer matrix 501 and possibly glass fiber mat 502 (step 50). Also metal cords 503 are provided preferably having an adhesion layer 504 around the surface of the metal cords 503. Most preferably the metal cord and adhesion layer are provided as a metal cord tape 505. (step 51).

As shown in step 52 of FIG. 5, the glass mat reinforced thermoplastic prepreg 500 is heated to soften the polymer material 501 using a furnace 506. Glass mat reinforced thermoplastic prepreg may be supported and transported through the furnace using a transporting means e.g. a belt 507. After being heated, the hot glass mat reinforced thermoplastic prepreg is taken off the transporting means as indicated with arrow 508, and is provided for addition to the metal cord tape in step 54.

As shown in step 53 of FIG. 5, the metal cord tape 505 may be heated to soften the polymer material 504 using a furnace 509. Metal cord tape may be supported and transported through the furnace using a transporting means e.g. a belt 510. Possibly after being heated, the metal cord tape is taken off the transporting means as indicated with arrow 508 and is provided for addition to the metal cord tape in step 54. A skilled man understands that in case the metal cord or metal cord tape is not to be heated, they may be provided to step 54 with no handling as in step 53.

In step 54, the metal cords or metal cord tape 505 and the hot glass mat reinforced thermoplastic prepreg 500 are brought together, e.g. by adding or stacking the different layers one on top of the other.

The stack 511, comprising the glass mat reinforced thermoplastic prepreg 500 and the metal cord or metal cord tape 505 are provided to a mold comprising two parts, being the female mold 512 and the male mold 513 (step 55a). The molds 512 and 513 are closed (step 55b) and the stack 511 is bend and shaped to the open area inside the closed mold.

After this molding (step 55a and 55b) the mold and the shaped impact beam is cooled to a temperature for which the polymer material 501 is solidified (cooling step 56). The impact beam may then be taken out of the molds and is ready for further processing, such as quality control or provision of additional openings.

Figure 6:
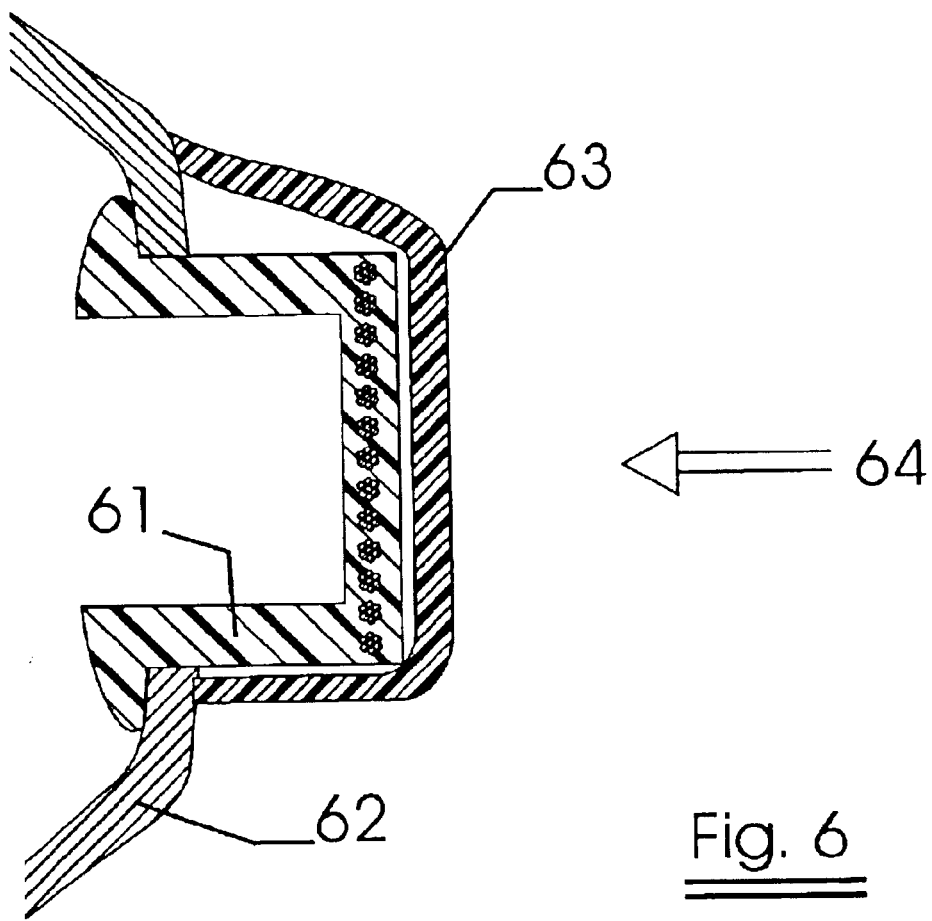
FIG. 6 shows schematically the use of an impact beam as subject of the invention to support a vehicle bumper.

An impact beam as subject of the invention is so provided, which may be used as support for soft bumpers of vehicles, as shown in FIG. 6.

An impact beam 61 is connected to peripheral elements 62 of the vehicle caochwork. A soft bumper element 63 may be provided covering the impact beam 61, when the vehicle strikes an object, an impact force with a direction 64 will apply in as indicated in FIG. 6.

The metal cord present in the impact beam 61 will adsorb the impact energy to a large extent, and the polymer material of the impact beam will adhere to the metal cord to a large extent. This to avoid that particles of the polymer material will be projected further towards the parts of the vehicle which are located behind the impact beam.

What is claimed is:

1. An impact beam comprising:
   a polymer matrix and a metal reinforcing structure for impact reinforcement, said metal reinforcing structure consisting of metal cords, wherein said metal cords are bonded to said polymer matrix so that a load can be transmitted directly between the polymer matrix and the metal cords.

2. The impact beam as in claim 1, wherein said metal cords are essentially parallel to each other.

3. The impact beam as in claim 2, said metal cords comprising metal elements having a diameter of equal to or more than 100 $\mu$m.

4. The impact beam as in claim 2, wherein said metal cords have an optical diameter of more than 200 $\mu$m.

5. The impact beam as in claim 2, wherein said polymer matrix comprises thermoplastic polymer material.

6. The impact beam as in claim 2, wherein said polymer matrix comprises polymer material selected from the group consisting of thermoplastic elastomers, polypropylene, polyethylene, polyamide, polyethylene terephtalate, polybutylene terephtalate, polycarbonate, polyphenylene oxide, and blends of polypropylene, polyethylene, polyamide, polyethylene terephtalate, polybutylene terephtalate, polycarbonate, and polyphenylene oxide.

7. The impact beams as in claim 6, wherein said polymer material is a polyamide- or polyolefin-based thermoplastic elastomer.

8. The impact beam as in claim 2, wherein said polymer matrix comprises thermoset polymer material.

9. The impact beam as in claim 8, wherein said polymer matrix comprises polymer material selected from the group consisting of unsaturated polyesters, epoxies, vinyl-esters and phenolic resins.

10. The impact beam as in claim 2, wherein said metal cords are steel cords.

11. The impact beam as in claim 2, wherein said metal cords are arranged in one or more planes, said planes being essentially parallel to each other.

12. The impact beam as in claim 2, wherein said polymer matrix comprises at least two layers, a first layer being present around a surface of said metal cords, and a second layer being present around said first layer.

13. The impact beam as in claim 12, wherein said first layer is made out of polymer material selected from the group consisting of thermoplastic elastomers, polypropylene, polyethylene, polyamide, polyethylene terephtalate, polybutylene terephtalate, polycarbonate, polyphenylene oxide, and blends of polypropylene, polyethylene, polyamide, polyethylene terephtalate, polybutylene terephtalate, polycarbonate, and polyphenylene oxide.

14. The impact beam as in claim 12, wherein said second layer is made out of polymer material selected from the group consisting of thermoplastic elastomers, polypropylene, polyethylene, polyamide, polyethylene terephtalate, polybutylene terephtalate, polycarbonate, polyphenylene oxide, and blends of polypropylene, polyethylene, polyamide, polyethylene terephtalate, polybutylene terephtalate, polycarbonate, and polyphenylene oxide.

15. The impact beam as in claim 2, wherein said metal cords have a mechanical bond with said polymer matrix.

16. The impact beam as in claim 2, wherein said metal cords have a chemical bond with said polymer matrix.

17. The impact beam as in claim 2, wherein said polymer matrix further comprises glass- or C-fibers, polymeric fibers and/or mineral fillers.

18. Use of the impact beam as in claim 2 for support of bumpers of vehicles or to improve the impact resistance of a vehicle's coachwork.

* * * * *